(12) United States Patent
Chang et al.

(10) Patent No.: US 11,502,365 B2
(45) Date of Patent: Nov. 15, 2022

(54) POUCH BATTERY MODULE

(71) Applicant: CALB Co., Ltd., Jiangsu (CN)

(72) Inventors: Zhiyuan Chang, Luoyang (CN); Xiaoyuan Du, Luoyang (CN); Yanbing Zhang, Luoyang (CN); Zhengkun Wan, Luoyang (CN); Yongguang Zhang, Luoyang (CN)

(73) Assignee: CALB Co., Ltd., Jiangsu (CN)

( * ) Notice: Subject to any disclaimer, the term of this patent is extended or adjusted under 35 U.S.C. 154(b) by 99 days.

(21) Appl. No.: 17/010,825

(22) Filed: Sep. 3, 2020

(65) Prior Publication Data

US 2021/0305546 A1 Sep. 30, 2021

(30) Foreign Application Priority Data

Mar. 27, 2020 (CN) .......................... 202020423795.8

(51) Int. Cl.
| | |
|---|---|
| *H01M 50/24* | (2021.01) |
| *H01M 10/613* | (2014.01) |
| *H01M 10/625* | (2014.01) |
| *H01M 10/655* | (2014.01) |
| *H01M 50/502* | (2021.01) |
| *H01M 50/543* | (2021.01) |
| *H01M 50/20* | (2021.01) |
| *H01M 10/48* | (2006.01) |

(52) U.S. Cl.
CPC .......... *H01M 50/24* (2021.01); *H01M 10/482* (2013.01); *H01M 10/486* (2013.01); *H01M 10/613* (2015.04); *H01M 10/625* (2015.04); *H01M 10/655* (2015.04); *H01M 50/20* (2021.01); *H01M 50/502* (2021.01); *H01M 50/543* (2021.01); *H01M 2220/20* (2013.01)

(58) Field of Classification Search
CPC .... H01M 50/24; H01M 50/20; H01M 50/502; H01M 50/543; H01M 10/613; H01M 10/625; H01M 10/655; H01M 10/482; H01M 10/486
See application file for complete search history.

(56) References Cited

U.S. PATENT DOCUMENTS

| | | | |
|---|---|---|---|
| 2014/0227576 A1 | 8/2014 | Meintschel et al. | |
| 2017/0256830 A1* | 9/2017 | Qiu ..................... | H01M 10/625 |
| 2019/0067762 A1* | 2/2019 | Zhang ................. | H01M 10/617 |
| 2019/0393476 A1* | 12/2019 | Zeng ................... | H01M 50/209 |
| 2021/0126323 A1* | 4/2021 | Wang .................. | H01M 50/531 |

FOREIGN PATENT DOCUMENTS

| | | | | |
|---|---|---|---|---|
| CN | 207282558 | | 4/2018 | |
| CN | 108336450 | | 7/2018 | |
| CN | 209104222 | * | 7/2019 | .............. H01M 2/10 |
| CN | 209658254 | | 11/2019 | |
| CN | 210040348 | | 2/2020 | |
| EP | 3451413 | | 3/2019 | |

OTHER PUBLICATIONS

"Search Report of Europe Counterpart Application", dated Mar. 16, 2021, p. 1-p. 7.

* cited by examiner

*Primary Examiner* — Karie O'Neill Apicella
(74) *Attorney, Agent, or Firm* — JCIP Global Inc.

(57) ABSTRACT

A pouch battery module is provided. The pouch battery module includes a metal housing, wherein a plurality of pouch battery cells arranged along a first direction is disposed inside the metal housing; and a rigid insulation plate being provided between an outermost pouch battery cell and the metal housing along the first direction.

15 Claims, 6 Drawing Sheets

POUCH BATTERY MODULE

CROSS-REFERENCE TO RELATED APPLICATION

This application claims the priority benefit of China application serial no. 202020423795.8, filed on Mar. 27, 2020. The entirety of the above-mentioned patent application is hereby incorporated by reference herein and made a part of this specification.

TECHNICAL FIELD

The disclosure relates to the technical field of battery manufacturing, and more particularly, to a pouch battery module.

BACKGROUND

Due to the advancement of new energy power battery technology and the vigorous promotion of government agencies of various countries, the application of new energy power batteries is becoming more and more widespread, especially in the field of electric vehicles. At present, pouch lithium batteries are normally installed in a frame structure. However, the frame structure is composed of a plastic frame and a heat sink plate embedded in the plastic frame. In this way, multiple battery packs will require multiple frame structures, resulting in increased weight and increased cost of the pouch battery module.

SUMMARY

The disclosure provides a pouch battery module, which includes:

a metal housing, wherein a plurality of pouch battery cells arranged along a first direction is disposed inside the metal housing;

a rigid insulation plate, being provided between an outermost pouch battery cell and the metal housing along the first direction.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

The pouch battery module in the present disclosure uses the rigid insulation plates to assemble the pouch battery cells, which can reduce the weight of the pouch battery module and increase the energy density of the pouch battery module. In the pouch battery module of the present disclosure, the pouch battery cells are arranged along the first direction. Further, in the first direction, the rigid insulation plates on the two sides of the pouch battery component can secure the pouch battery component and can prevent the pouch battery component from being scratched when the pouch battery component is installed inside a metal housing. This assembly method can eliminate the frame structure for securing the pouch battery component, greatly reduce the number of module components, improve the module energy density, and reduce the module cost.

Figure 1:
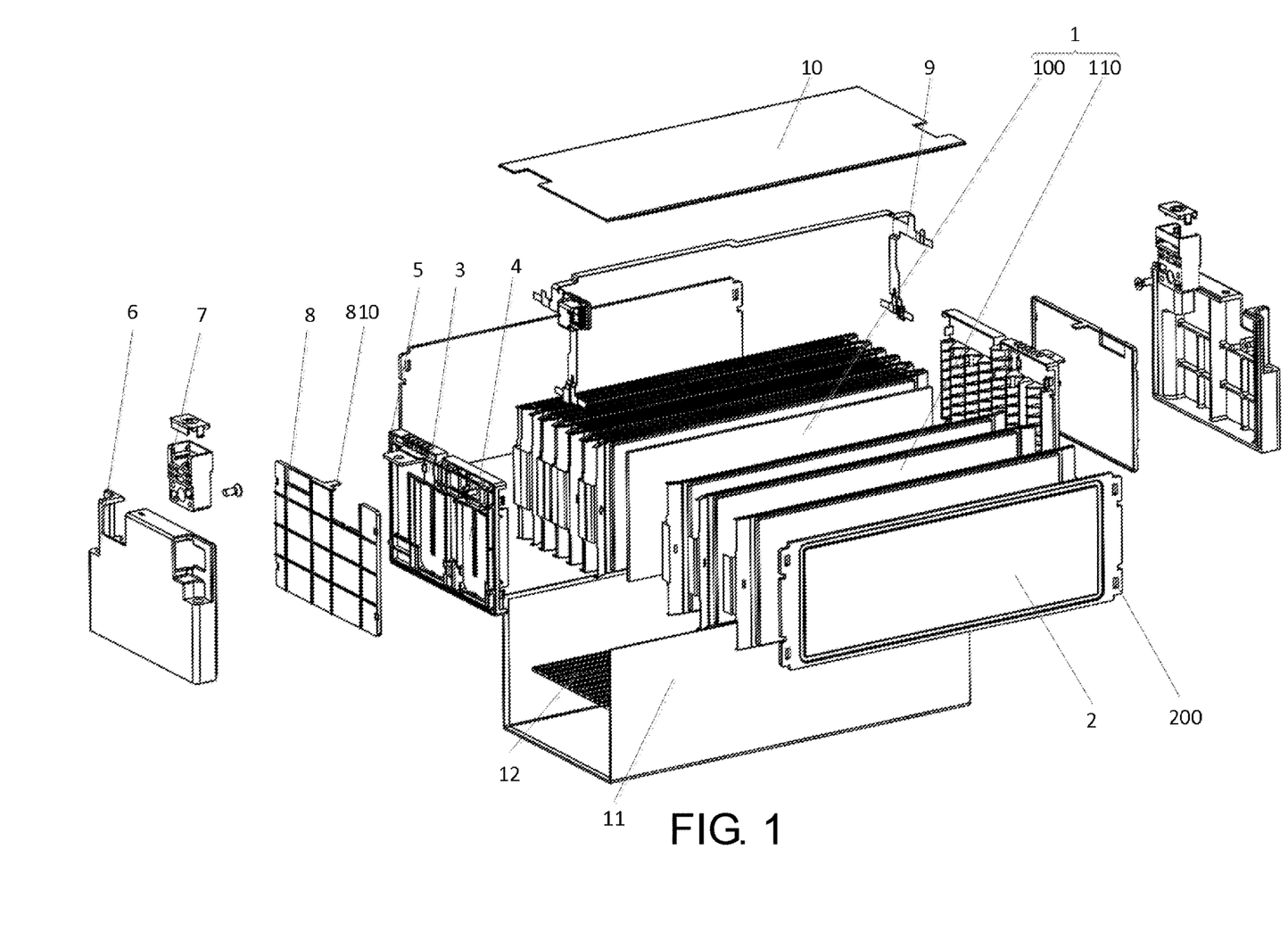
FIG. 1 is an exploded view of a pouch battery module according to an embodiment of the present disclosure.

Referring to FIG. 1, the present disclosure provides a pouch battery module, which includes:

a pouch battery component 1, the pouch battery component 1 including a plurality of pouch battery cells 110 arranged along a first direction;

two rigid insulation plates 2, the two rigid insulation plates 2 being respectively provided on two sides of the pouch battery component 1 along the first direction.

In the pouch battery module of the present disclosure, the pouch battery cells 110 are arranged along the first direction. Further, in the first direction, the rigid insulation plates 2 on the two sides of the pouch battery component 1 can secure the pouch battery component 1 and can prevent the pouch battery component 1 from being scratched when the pouch battery component 1 is installed inside a metal housing 11. This assembly method can eliminate the frame structure for securing the pouch battery component 1, greatly reduce the number of module components, improve the module energy density, and reduce the module cost.

It should be noted that the rigid insulation plates 2 and the pouch battery component 1 are connected in a bonding manner, and the adjacent two flexible battery cells 110 are connected in a bonding manner. Further, a material of the rigid insulation plate 2 is generally plastic for insulation and mechanical protection so that the pouch battery component 1 can be fitted into the metal housing 11 more easily.

In addition, the first direction is a thickness direction of the soft battery cell 110.

As an optional method, a heat insulation cushion 100 provided between each adjacent two of the pouch battery cells 110 is further included. The heat insulation cushion 100 can reserve swelling gaps for cyclic swellings of the pouch battery cells 110, and provide a thermal insulation function to prevent the thermal runaway from spreading at the same time; and the pouch battery cell 110 and the heat insulation cushion 100 are bonded by a structural adhesive.

As an optional method, two wiring harness plates 3 provided between the two rigid insulation plates 2 and respectively engaged with end portions of the two rigid insulation plates 2 are further included. Because the wiring harness plates 3 are connected to the rigid insulation plate 2, the wiring harness plates 3 will not move relative to the pouch battery component 1 provided between the two rigid insulation plates 2.

It should be noted that, each end of the rigid insulation plate 2 is provided with at least two via holes 200, and hooks 340 for fitting with the via holes 200 are provided on a contact end of the wiring harness plate 3 and the rigid insulation plate 2. In this way, the connection between the rigid insulation plate 2 and the wiring harness plate 3 becomes more convenient, and has a higher stability.

Figure 2:
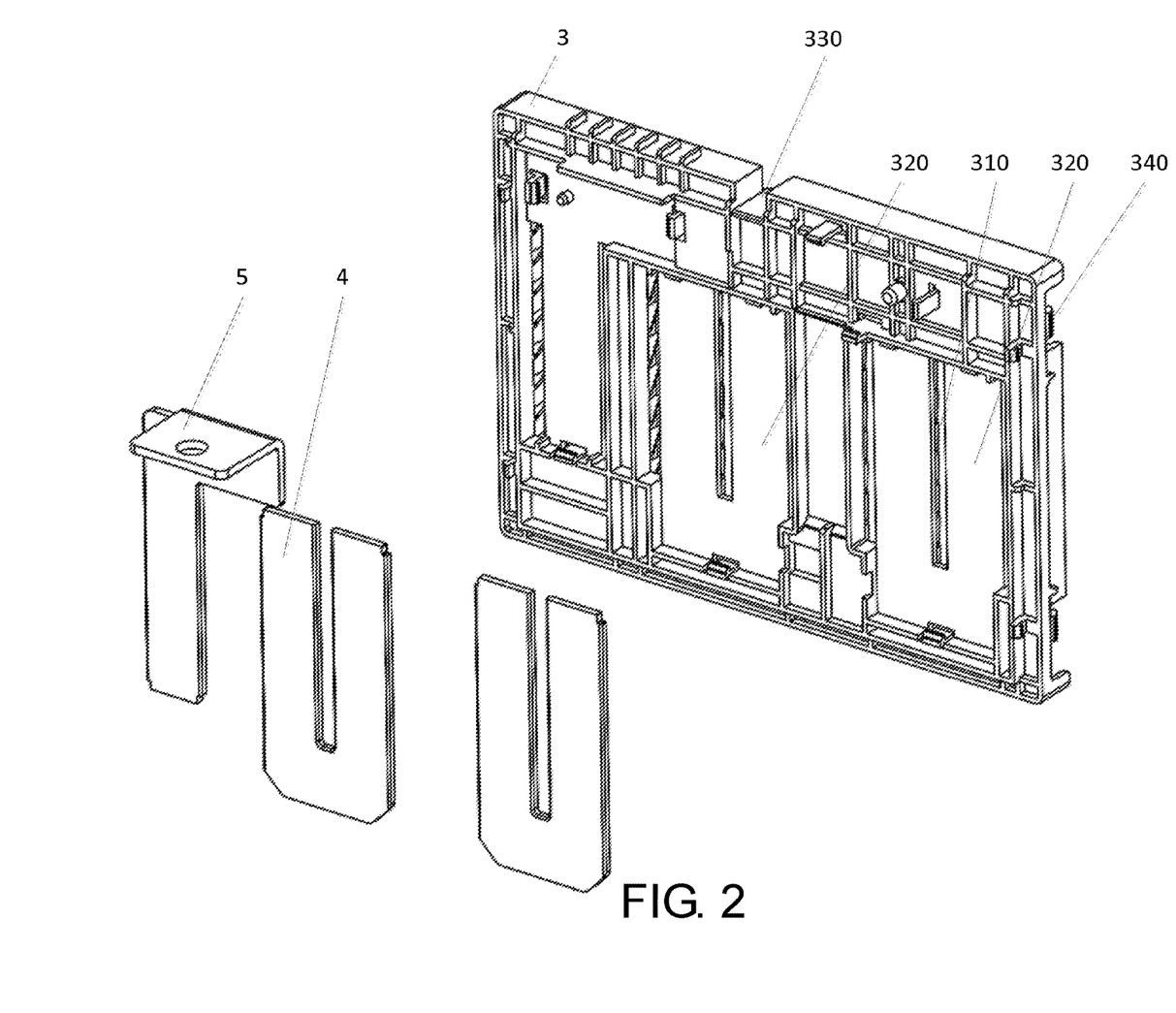
FIG. 2 is a schematic structural diagram of a wiring harness plate, a conductive piece, and a high voltage terminal of a pouch battery module according to an embodiment of the present disclosure.

As an optional method, continuing to refer to FIG. 2, a conductive piece 4 and a high voltage terminal 5 are further included. The conductive piece 4 and the high voltage terminal 5 are both installed on the wiring harness plate 3. The conductive piece 4 is configured to electrically connect the adjacent pouch battery cells 110. The high voltage terminal 5 is electrically connected to the pouch battery component 1. Specifically, the conductive piece is attached on one side of the wiring harness plate 3 away from the pouch battery cells 110. A slot 310 for a tab on the pouch battery cell 110 to pass through and a notch 320 for attaching with the conductive piece 4 and the high voltage terminal 5 are provided on the wiring harness plate 3. During connection, the tab on the pouch battery cell 110 passes through the slots 310 and is bent onto the conductive piece 4. Then, an electrical connection between the tab on the pouch battery cell 110 and the conductive piece 4 is achieved by a laser soldering. Because the wiring harness plate 3 is connected to the rigid insulation plate 2, by soldering the tab onto the wiring harness plate 3 when the tab is being tightly pressed, a displacement of the components of the wiring harness board 3 can be effectively prevented to reduce the frequency of safety failures.

Figure 5:
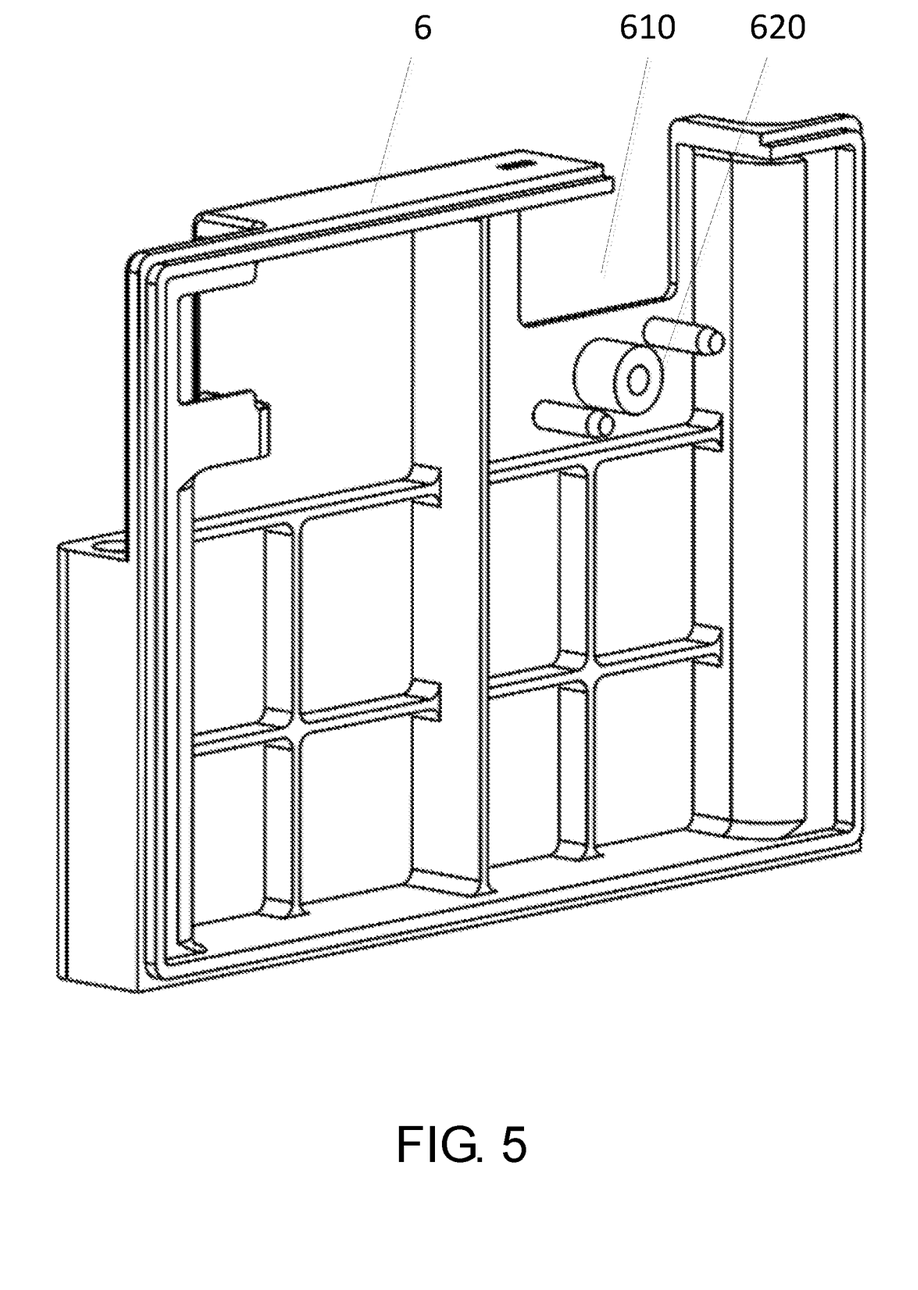
FIG. 5 is a schematic structural diagram of an end plate in a pouch battery module according to an embodiment of the present disclosure.

As an optional method, continuing to refer to FIG. 5, an end plate 6 and a lead-out support 7 are further provided. A through hole for the high voltage terminal 5 to pass through is provided on the lead-out support 7; the end plate 6 is located on one side of the wiring harness plate 3 facing away from the pouch battery cells 110, and an installation portion for installing the lead-out support 7 is provided on the end plate 6. Specifically, the installation portion includes an installation slot 610 provided on the end plate 6, and three installation posts 620 located under the installation slot 610 and fixed on one side of the end plate 6 close to the wiring harness plate 3. Here, an installation hole is provided on the installation post 620 at the mid-position, and the installation posts on two sides of that installation post 620 are positioning poses. Connection holes for fitting with the three installation posts 620 are provided on the lead-out support 7, and a screw or a rivet is used to install the lead-out support 7 onto the end plate 6. In addition, a through hole for the high voltage terminal 5 to pass through is further provided on the lead-out support 7. After the high-voltage terminal 5 passes through the through hole, an external conductive piece and the high voltage terminal 5 are electrically connected by screws to realize the output of the electrical energy of the module to the outside. Compared with being fixed on components with low rigidity such as a battery pack, a sensor substrate, the insulation end plate 8 and the like, the connection strength and reliability of the lead-out support 7 are greatly improved.

Figure 3:
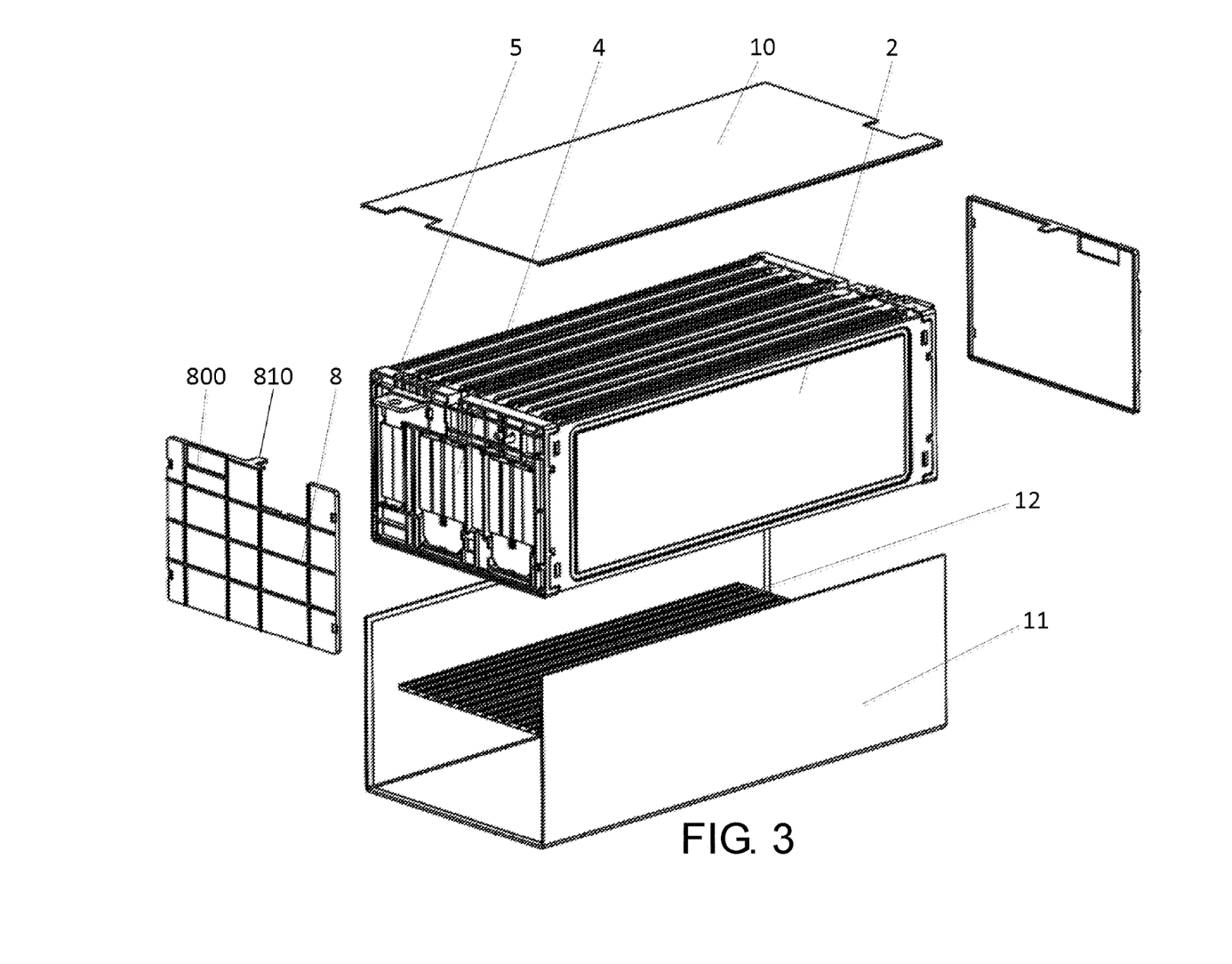
FIG. 3 is an exploded view of a partial structure of a pouch battery module according to an embodiment of the present disclosure.

As an optional method, continuing to refer to FIG. 3, the insulation end plate 8 is further included. The insulation end plate 8 is provided between the end plate 6 and the wiring harness plate 3. Here, an opening 800 for the high voltage terminal 5 to pass through is provided on the insulation end plate 8. The insulation end plate 8 is attached on the wiring harness plate 3 to isolate conductive components on the pouch battery module from the end plate 6, so as to improve the electrical safety of the pouch battery component 1.

Figure 4:
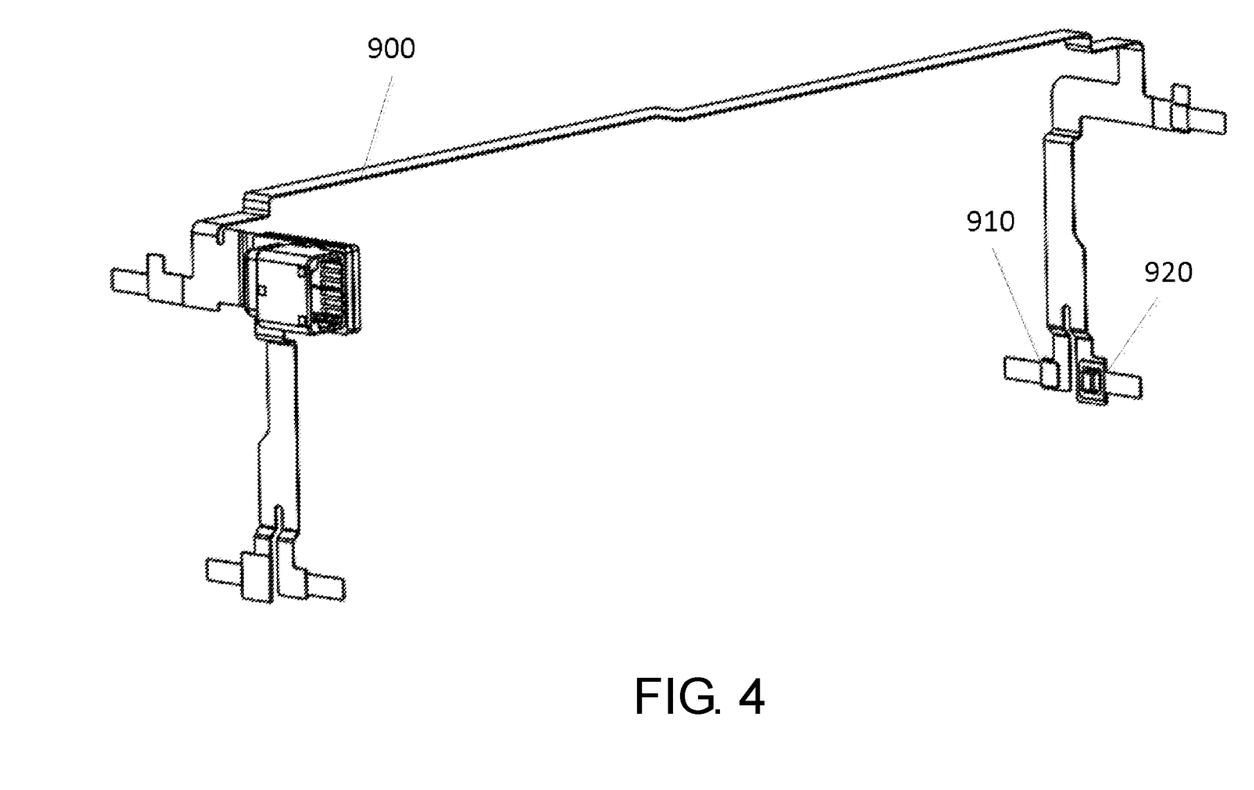
FIG. 4 is a schematic structural diagram of a signal collection component in a pouch battery module according to an embodiment of the present disclosure.

As an optional method, continuing to refer to FIG. 4, a signal collection component 9 is further provided. The signal collection component 9 includes a flexible circuit board 900 and a voltage collector 910 and a temperature sensor 920 provided on the flexible circuit board 900. Here, the flexible circuit board 900 is attached on the two wiring harness plates 3. Voltage and temperature collection of the pouch battery component 1 is realized by one signal collection component 9, and the flexible circuit board 900 in the signal collection component 9 has high flexibility and small volume and weight, so as to further improve the space utilization rate of the battery pack and the ease of assembly. Meanwhile, a signal collection realized by one signal collection component 9 is more reliable than those realized by connecting multi-section collection lines by connectors or a soldering method. Moreover, since one integrated signal collection component 9 is used for collecting module voltage and temperature, the connection failure in the signal collection component 9 can be avoided, and the risk of collection failure can be effectively reduced.

It should be noted that, a groove 330 for accommodating the flexible circuit board 900 is provided on one end of the wiring harness plate 3 close to a metal plate. A protrusion 810 is provided on the insulation end plate 8. The protrusion 810 fits with the groove 330. Two ends of the flexible circuit board 900 are located between the protrusion 810 and the groove 330. Accordingly, a distance between the flexible circuit board 900 and a metal plate 10 can be increased to protect the flexible circuit board 900 from being damaged when the temperature of the metal plate 10 is overly high (e.g., when the metal plate 10 and the end plate 6 are soldered).

Figure 6:
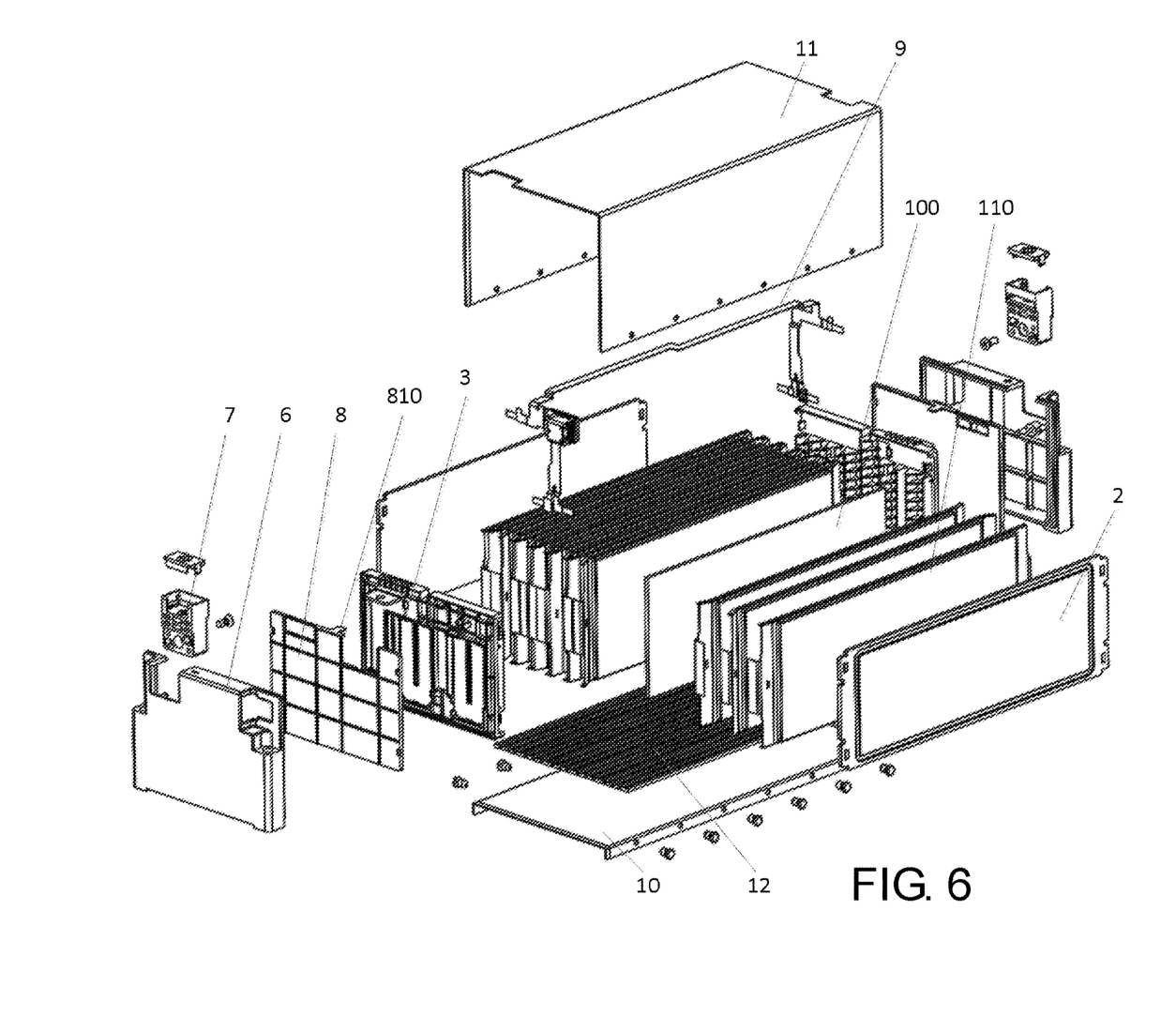
FIG. 6 is another exploded view of a pouch battery module according to an embodiment of the present disclosure.

As an optional method, the metal plate 10, a metal housing 11 and a thermal pad 12 are further included. The thermal pad 12 is provided between the metal plate 10 and the pouch battery component 1, or the thermal pad 12 is provided between the metal housing 11 and the pouch battery component 1. An installation chamber for installing the pouch battery component 1 is formed between the metal plate 10 and the metal housing 11. Among them, the metal plate 10 and the metal housing 11 can be mechanically connected by riveting (as shown in FIG. 6), or can be connected by soldering. The metal housing 11 is provided in a U-shape to protect the rigid insulation plate 2 on the pouch battery component 1. Because the metal housing 11 is an open structure, the process difficulty of installing the pouch battery component 1 into the metal housing 11 of the U-shape is greatly reduced. Moreover, the metal housing 11 and the metal plate 10 are made of a thin metal plate, its weight, manufacturing time and cost are lower as compared to the extrusion process. In addition, the thermal pad 12 can allow the heat generated in the pouch battery component 1 to be conducted to the metal plate 10 or the metal housing 11 through the thermal pad 12. Further, because the heat dissipation effect of the metal material is better, a heat dissipation speed of the pouch battery component 1 can be improved.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A pouch battery module, comprising:
a metal housing, wherein a plurality of pouch battery cells arranged along a first direction is disposed inside the metal housing;
a rigid insulation plate, being provided between an outermost pouch battery cell and the metal housing along the first direction; and
a heat insulation cushion provided between each adjacent two of the pouch battery cells, wherein each of the heat insulation cushions are bonded to the pouch battery cells by a structural adhesive,
wherein the rigid insulation plate is provided as two rigid insulation plates, the pouch battery cells are arranged in between the two rigid insulation plates along the first direction, the pouch battery module further comprises two wiring harness plates, and the two wiring harness plates are provided between the two rigid insulation plates and respectively engaged with end portions of the two rigid insulation plates.

2. The pouch battery module according to claim 1, further comprising: a conductive piece and a high voltage terminal; the conductive piece and the high voltage terminal both being installed on the wiring harness plate, the conductive piece being configured to electrically connect the adjacent pouch battery cells, the high voltage terminal being electrically connected to the pouch battery cells.

3. The pouch battery module according to claim 2, further comprising: an end plate and a lead-out support, a through hole for the high voltage terminal to pass through being provided on the lead-out support;
the end plate being located on one side of the wiring harness plate facing away from the pouch battery cells, an installation portion for installing the lead-out support being provided on the end plate.

4. The pouch battery module according to claim 3, further comprising: an insulation end plate, the insulation end plate being provided between the end plate and the wiring harness plate,
wherein an opening for the high voltage terminal to pass through is provided on the insulation end plate.

5. The pouch battery module according to claim 4, wherein the pouch battery module further comprises a signal collection component, and the signal collection component comprises a flexible circuit board and a voltage collector and a temperature sensor provided on the flexible circuit board, wherein the flexible circuit board is attached or bonded on the two wiring harness plates.

6. The pouch battery module according to claim 5, wherein a groove for accommodating the flexible circuit board is provided on one end of the wiring harness plate; a protrusion is provided on the insulation end plate; the protrusion fits with the groove; two ends of the flexible circuit board are located between the protrusion and the groove.

7. The pouch battery module according to claim 1, further comprising: a metal plate and a thermal pad, the thermal pad being provided between the metal plate and the pouch battery cells, or the thermal pad being provided between the metal housing and the pouch battery cells;
an installation chamber for installing the pouch battery cells being formed between the metal plate and the metal housing.

8. The pouch battery module according to claim 1, further comprising: a metal plate and a thermal pad, the thermal pad being provided between the metal plate and the pouch battery cells, or the thermal pad being provided between the metal housing and the pouch battery cells;
an installation chamber for installing the pouch battery cells being formed between the metal plate and the metal housing.

9. The pouch battery module according to claim 2, further comprising: a metal plate and a thermal pad, the thermal pad being provided between the metal plate and the pouch battery cells, or the thermal pad being provided between the metal housing and the pouch battery cells;
an installation chamber for installing the pouch battery cells being formed between the metal plate and the metal housing.

10. The pouch battery module according to claim 3, further comprising: a metal plate and a thermal pad, the thermal pad being provided between the metal plate and the pouch battery cells, or the thermal pad being provided between the metal housing and the pouch battery cells;

an installation chamber for installing the pouch battery cells being formed between the metal plate and the metal housing.

11. The pouch battery module according to claim 4, further comprising: a metal plate and a thermal pad, the thermal pad being provided between the metal plate and the pouch battery cells, or the thermal pad being provided between the metal housing and the pouch battery cells;

an installation chamber for installing the pouch battery cells being formed between the metal plate and the metal housing.

12. The pouch battery module according to claim 5, further comprising: a metal plate and a thermal pad, the thermal pad being provided between the metal plate and the pouch battery cells, or the thermal pad being provided between the metal housing and the pouch battery cells;

an installation chamber for installing the pouch battery cells being formed between the metal plate and the metal housing.

13. The pouch battery module according to claim 6, further comprising: the metal plate and a thermal pad, the thermal pad being provided between the metal plate and the pouch battery cells, or the thermal pad being provided between the metal housing and the pouch battery cells;

an installation chamber for installing the pouch battery cells being formed between the metal plate and the metal housing.

14. The pouch battery module according to claim 1, wherein each end of the rigid insulation plate is provided with at least two via holes, and hooks for fitting with the via holes are provided on a contact end of the wiring harness plate and the rigid insulation plate.

15. The pouch battery module according to claim 1, wherein a material of the rigid insulation plate is plastic.

\* \* \* \* \*